(12) United States Patent
O'Connor et al.

(10) Patent No.: US 7,565,464 B2
(45) Date of Patent: Jul. 21, 2009

(54) PROGRAMMABLE TRANSACTION INITIATOR ARCHITECTURE FOR SYSTEMS WITH SECURE AND NON-SECURE MODES

(75) Inventors: Dennis M. O'Connor, Chandler, AZ (US); Mark N. Fullerton, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 11/013,217

(22) Filed: Dec. 14, 2004

(65) Prior Publication Data

US 2006/0129710 A1 Jun. 15, 2006

(51) Int. Cl.
*G06F 3/00* (2006.01)
*H04L 9/32* (2006.01)

(52) U.S. Cl. .............................................. 710/36; 726/2
(58) Field of Classification Search ...................... 726/2
See application file for complete search history.

(56) References Cited

U.S. PATENT DOCUMENTS

| 5,692,124 | A  | * | 11/1997 | Holden et al. ................... 726/2 |
| 5,832,228 | A  | * | 11/1998 | Holden et al. ................ 709/225 |
| 6,336,187 | B1 | * | 1/2002  | Kern et al. ................... 713/161 |
| 2002/0004906 | A1 | * | 1/2002 | Rajasekharan et al. ...... 713/200 |
| 2002/0161941 | A1 | * | 10/2002 | Chue et al. ..................... 710/22 |
| 2003/0162527 | A1 | * | 8/2003 | Dorenbeck et al. .......... 455/410 |
| 2004/0143714 | A1 |   | 7/2004 | Watt |
| 2005/0015611 | A1 | * | 1/2005 | Poisner ........................ 713/200 |

OTHER PUBLICATIONS

Black, Paul E., "doubly linked list", in *Dictionary of Algorithms and Data Structures [online], Paul E. Black, ed., U.S. National Institute of Standards and Technology*, Available from: http://www.nist.gov/dads/HTML/doublyLinkedList.html. (May 31, 2006), Whole Document.

Black, Paul E., "linked list", in *Dictionary of Algorithms and Data Structures [online], Paul E. Black, ed., U.S. National Institute of Standards and Technology*. . Available from: http://www.nist.gov/dads/HTML/linkedList.html, (Apr. 23, 2007), Whole Document.

Bockholt, Bob , "circular list", in *Dictionary of Algorithms and Data Structures [online], Paul E. Black, ed., U.S. National Institute of Standards and Technology*, Available from: http://www.nist.gov/dads/HTML/circularlist.html. (Dec. 17, 2004), Whole Document.

(Continued)

*Primary Examiner*—Henry W. H. Tsai
*Assistant Examiner*—Kris Rhu
(74) *Attorney, Agent, or Firm*—Blakely, Sokoloff, Taylor & Zafman LLP

(57) ABSTRACT

A wireless device dynamically programs a control register for a command-chain driven DMA device. The control register stores a beginning address of the linked list of commands and a secure bit. The secure bit is set if the transaction writing register is secure and a bit in the data being written into the register is set. DMA devices and other bus-mastering peripherals perform tasks described via a command chain that has access to secure resources when the processor is operating in the secure mode and the secure bit is set.

13 Claims, 4 Drawing Sheets

OTHER PUBLICATIONS

Rodgers, Patrick , "ordered linked list", *in Dictionary of Algorithms and Data Structures [online], Paul E. Black, ed., U.S. National Institute of Standards and Technology*. Available from: http://www.nist.gov/dads//HTML/orderedLinkedList.html, (Dec. 17, 2004), Whole Document.

* cited by examiner

PROGRAMMABLE TRANSACTION INITIATOR ARCHITECTURE FOR SYSTEMS WITH SECURE AND NON-SECURE MODES

The proliferation of mobile devices has evolved into mobile computing platforms, complete with needs for trusted services. Operators, manufacturers and wireless users need confidence in the integrity and security of the wireless network, as well as the wireless device in the distribution of digital media. Mobile devices have access to sensitive personal data for online payment and other private information, and therefore, enable secure transactions to deliver protected and secure services.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
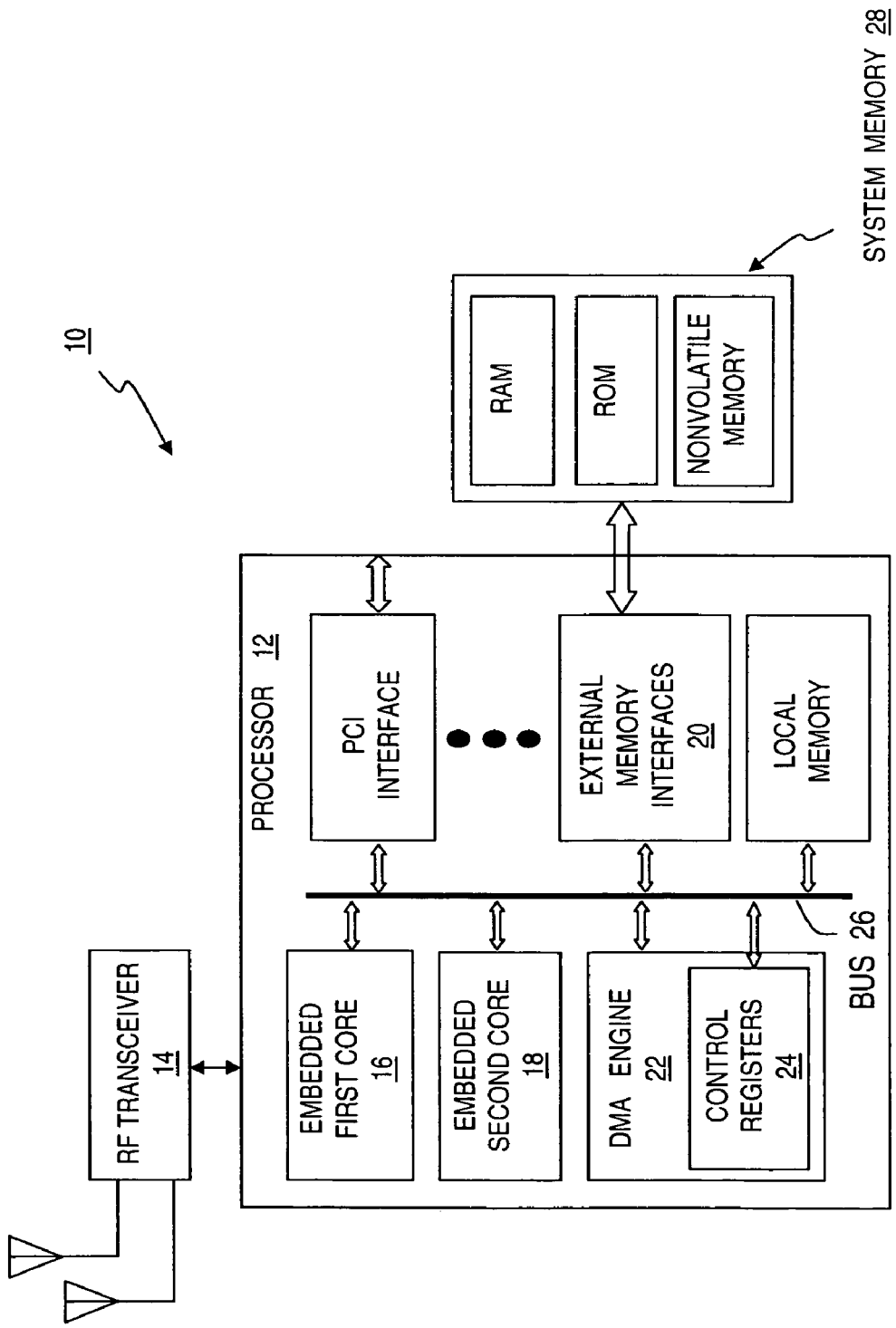
FIG. 1 is a diagram that illustrates a device that incorporates circuitry and algorithms to enable devices to provide secure communications in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may further mean that two or more elements are not in direct contact with each other, but yet still co-operate or interact with each other.

FIG. 1 illustrates features of the present invention that may be incorporated in a device 10. Device 10 may have applications in laptops, MP3 players, cameras, medical or biotech equipment, automotive safety and protective equipment, and automotive infotainment products. However, it should be understood that the scope of the present invention is not limited to these examples. Additional examples of applications, some including wireless devices operating in networks such as mobile phones, communicators and Personal Digital Assistants (PDAs) may incorporate the present invention.

As an example of device 10 operating in a wireless communications embodiment, a transceiver 14 both receives and transmits a modulated signal from one or more antennas. The analog front end transceiver may be a stand-alone Radio Frequency (RF) integrated analog circuit, or alternatively, be embedded with a processor 12 as a mixed-mode integrated circuit. The received modulated signal may be frequency down-converted, filtered, then converted to a baseband, digital signal.

Processor 12 may include baseband and applications processing functions that utilize one or more processor cores. Cores 16 and 18, in general, fetch instructions, generate decodes, find operands, and perform appropriate actions, then store results. The use of multiple cores may allow one core to be dedicated to handle application specific functions such as, for example, graphics, security, modem functions, etc. For instance, one core may be used for low-level demodulation tasks while the other core may be used for the high-speed packet data channel scheduling algorithms. Further, for some applications the multiple cores may allow processing workloads to be shared across the cores.

A hardware/software interface 20 allows data to be exchanged between processor 12 and system memory 28. System memory 28 may include memories such as a Random Access Memory (RAM), a Read Only Memory (ROM) and a nonvolatile memory, or any combination of volatile and nonvolatile memories. The type or variety of memories included in system memory 28 is not a limitation of the present invention. The memory interface 20 and peripheral blocks such as a PCI interface block, among others, may support bus-mastering. Bus-mastering refers to a feature that enables a controller connected to the bus to initiate communications directly with other_devices on the bus without going through the processor.

Processor 12 may include a Direct Memory Access (DMA) engine 22 that like the bus-mastering devices, allows devices to transfer data to/from the system's memory without the intervention of the processor. DMA devices and bus-mastering peripherals may also be referred to as transaction initiators. DMA engine 22 may include device drivers and channels with associated address registers and count registers (not shown). The DMA efficiently transfers data and frees the processor to handle other operations.

In the description and embodiments presented, rights are granted to transactions based on a secure/non-secure status, but the use of security as the "right" is provided as an example and it should be understood that the invention is not limited to such an instantiation. It should further be understood that the figures and description use a single bit to store an attribute such as the secure/non-secure status, but that a hierarchy of rights levels may be used. Put another way, multiple bits may represent the status of a transaction or a command chain and allow the DMA or bus-mastering peripheral to follow a defined set of allowed status transitions. By way of example, instead of having a secure/non-secure status, devices and transactions may have multiple status levels (such as 256 status levels or more), with links from one command to the next command to designate that command as having a particular status level that was less than or equal to the status level of the current command. Alternatively, an arbitrary table of allowed status transitions may exist, which would specify status levels for current commands and allowed status levels for the next commands in the list.

Some prior art processors run in secure or non-secure mode, but restrict the DMA and the bus-mastering peripherals to only be accessible in one mode or the other. Thus, these prior art processors allocate DMA devices, bus-mastering peripherals, etc., to either the secure world or the non-secure world, but not both. This leads to inefficiencies such as duplicate hardware and lack of resources if the allocation of devices is inappropriate to the demand for each mode. The prioritization of secure and non-secure DMA devices or bus-mastering peripheral operations in prior art processors is complicated. In contrast to the prior art processors and in accordance with the present invention, DMA engine 22 resolves security issues without the inefficiencies found in these prior art processors. Further, the task of appropriately scheduling the secure and non-secure DMA devices or bus-mastering peripheral operations is simplified with the present invention.

Figure 2:
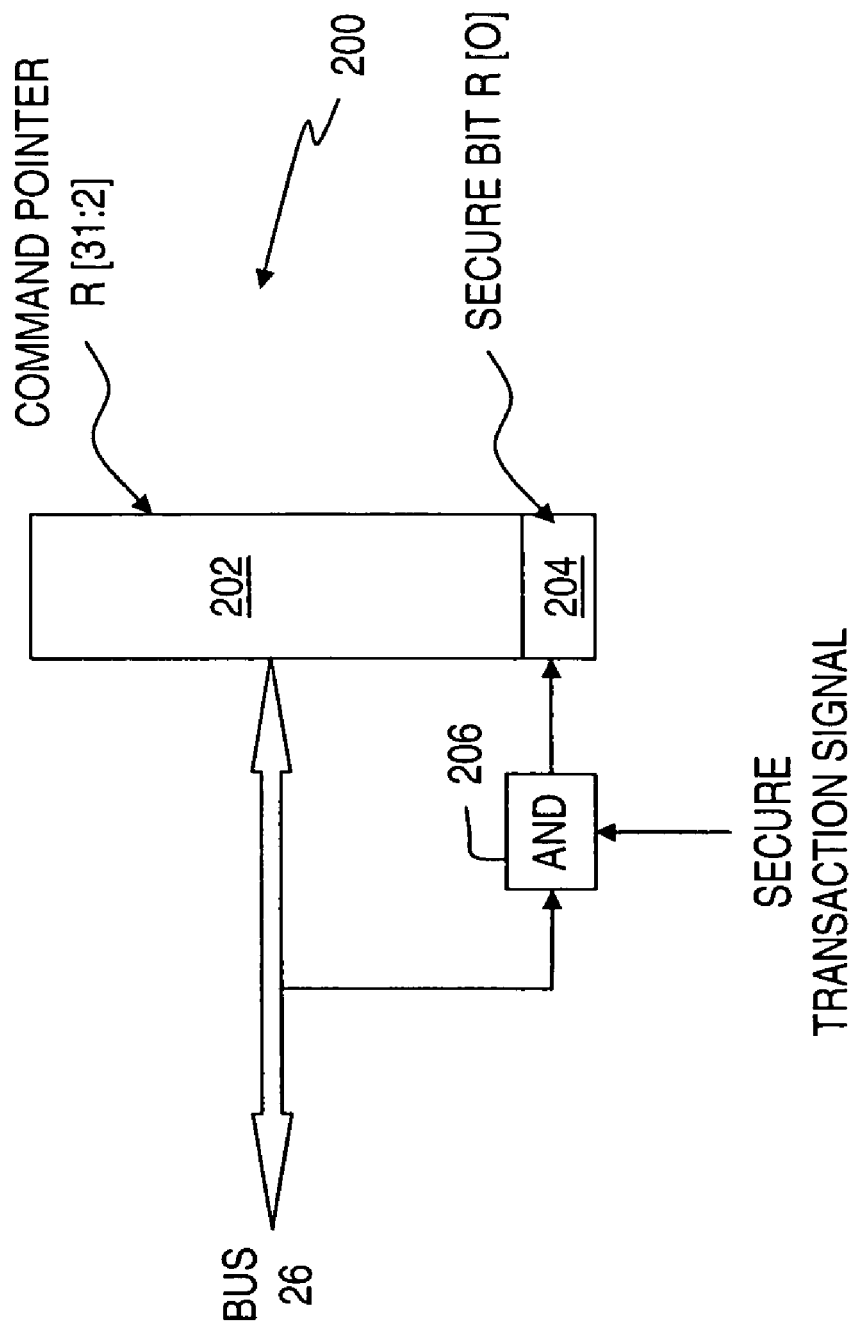
FIG. 2 is an embodiment that illustrates the control register of a command-chain driven DMA device.

FIG. 1 shows control registers 24, a portion of which is illustrated in FIG. 2 to provide details of the control register for a command-chain driven DMA device (both DMA engine 22 and bus-mastering devices) in accordance with the present invention. As shown, a register 200 is sufficient for storing a beginning address of the linked list of commands that the processor may process. In this embodiment, register 200 includes both a command pointer 202 and a secure bit 204. By way of example, command pointer 202 may include bits [31:1] and secure bit 204 may include bit [0], although the allocation of bits is arbitrary and not limiting to the present invention. Note that neither the number of bits in the register nor the assignment of the lower order bit as the secure bit are limiting to the present invention. Further note that the embodiment shown in FIG. 2 includes secure bit 204 along with command pointer 202 in register 200, but other embodiments may include a storage location for the secure bit that is physically separate from command pointer 202.

Processor 12 may program command pointer 202 with the address of the beginning of the linked list of commands by writing bus 26. However, secure bit 204 is not programmed directly from the bus as command pointer 202, but rather, this bit is conditionally set. In other words, secure bit 204 is set if the transaction writing register 200 is secure and the bit in the data being written into the register is set. AND-gate 206 ensures that both conditions are met, and then the stored value in secure bit 204 is set to the secure status. Again, the secure bit is set if the transaction writing the register is secure and the bit in the data being written into the register is set.

Figure 3:
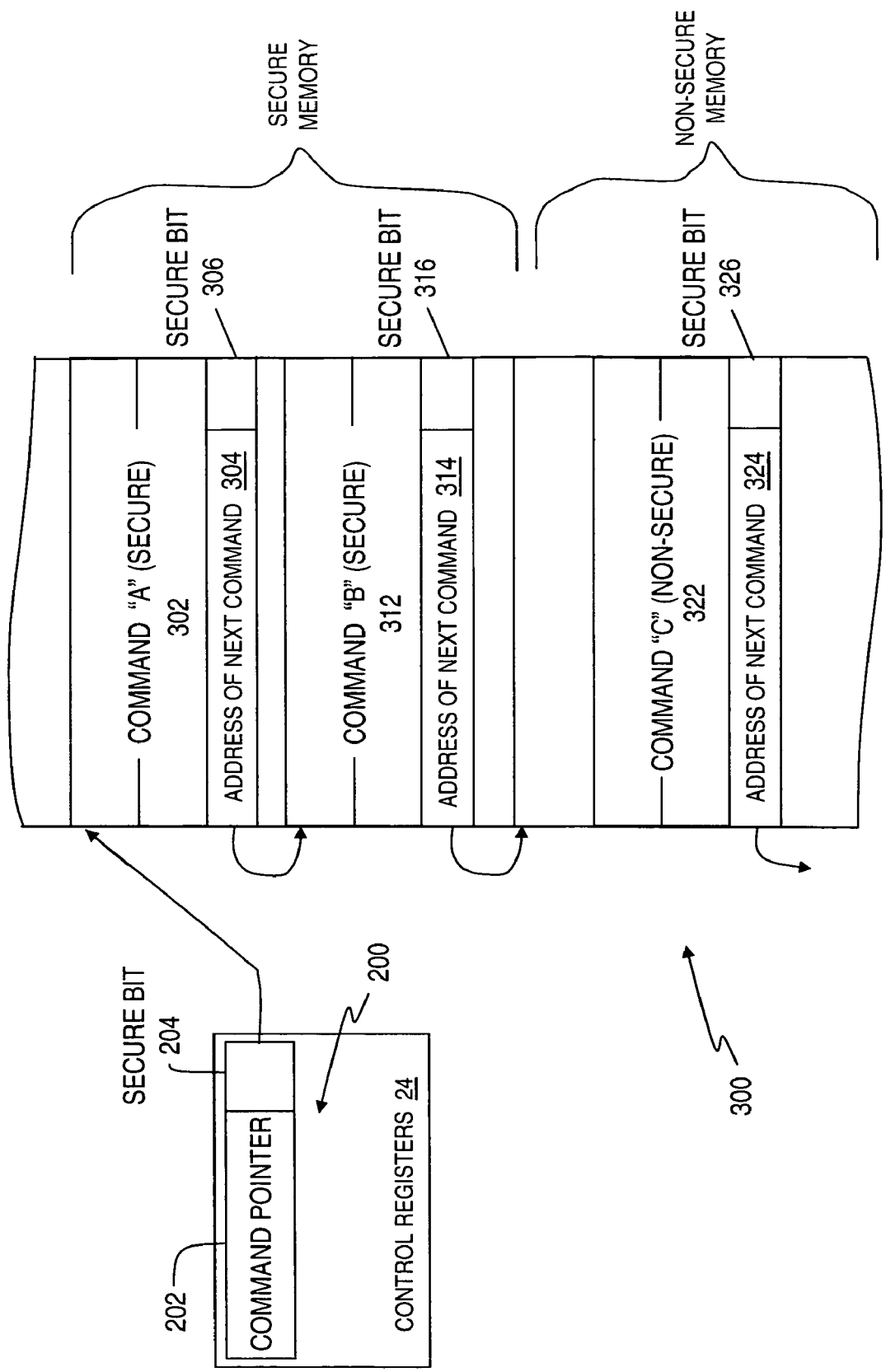
FIG. 3 is an embodiment of the control register and command-chain stored in memory.

FIG. 3 shows a memory 300 for storing a linked list of commands and illustrates how a bus-mastering device or DMA device may read the list of commands and then perform transfers between the resources under the control of that device and the memory in the system. In accordance with the present invention, each command may include a programmable attribute having corresponding rights and privileges. In the embodiment shown in the figure, the command may have a secure attribute or a non-secure attribute, although the security attributes are given as an example and other attributes may be designated. In other words, the type of attribute is not limiting to the present invention.

Register 200 includes a command pointer 202 and a secure bit 204 (also see control registers 24, FIG. 1). The memory 300 includes both a secure memory portion and a non-secure memory portion. Alternatively, separate blocks of memories may be designated as secure and non-secure, or a secure memory and a completely separate non-secure memory may be used. For ease of description, the secure memory potion is shown with two stored commands, i.e., command "A" 302 and command "B" 312. Included with command "A" 302 is an address of next command 304 having a secure bit 306 and included with command "B" 312 is an address of next command 314 having a secure bit 316. The non-secure memory potion is shown with a command "C" 322 and an address of next command 324 having a secure bit 326.

In operation, processor 12 performs bus operations and signals that it is operating in a secure or a non-secure mode to prevent un-trusted code from accessing secure resources. DMA devices and bus-mastering peripherals, i.e., the transaction initiators, are coupled to a bus and programmed by the processor to perform certain tasks which are described via a command chain that resides in a link list in memory 300. These DMA devices and bus-mastering peripherals may access secure resources when programmed by processor 12 operating in the secure mode.

For example, processor 12 may program DMA engine 22 to operate in the secure mode by writing register 200 with the address of the beginning of a linked list of commands and by writing secure bit 204. Secure bit 204 may be set to indicate that transactions in the command chain pointed to by the address stored in command pointer 202 are secure. Then, in accordance with the present invention, DMA engine 22, as a secure master, may designate a chain of commands as being secure. Again, secure command chains may be located in secure memory to prevent non-secure processors and devices from altering or examining the stored data. Hardware may be used to enforce that only processors and devices operating in the secure mode may read and modify any secure data stored in the secure memory.

In the example provided in FIG. 3, secure bit 204 may be set to indicate that the command list in command "A" 302 is secure. Commands are then read from command "A" 302 and tasks are performed based on these secure commands. After reading command "A" 302, an address for next command 304 is read which points to the next command in the command chain. As indicated in the figure, the pointer selects command "B" 312. In this example, secure bit 306 has previously been set to indicate that the commands in command "B" 312 are secure. Secure commands are then read from command "B" 312 and tasks based on these commands are performed. Continuing with the example, an address of the next command 314 stores the pointer to the next command in the command chain, this time selecting command "C" 322. Secure bit 316 has previously been set to indicate that the commands in command "C" 322 are non-secure.

As described in this example, a command chain may start out secure and drop to non-secure at any link in the chain. Rather than maintaining the same secure/non-secure status for the entire command chain, the DMA device or peripheral device may read the secure state of the next command from a bit in the current command, possibly in the pointer to the next command. If the DMA device or peripheral device was currently processing a secure chain, then this bit is heeded. However, if the command chain was currently non-secure, this bit is ignored and an exception may be generated and handled by the processor. This embodiment allows secure code to insert a list of secure commands in front of an existing list of non-secure commands.

By allowing the secure code to insert secure commands in front of non-secure commands, the threat of a denial-of-service attack by non-secure code may be reduced, which provides greater system efficiency. Secure bits 306 and 316 are set by a secure transaction and may be reset at the end of the operation being performed. Note that secure bit 204 may be set to indicate that transactions in the command chain pointed to by the address stored in command pointer 202 are non-secure. In this case the master is designated as non-secure and restricted to launching only non-secure command chains.

Figure 4:
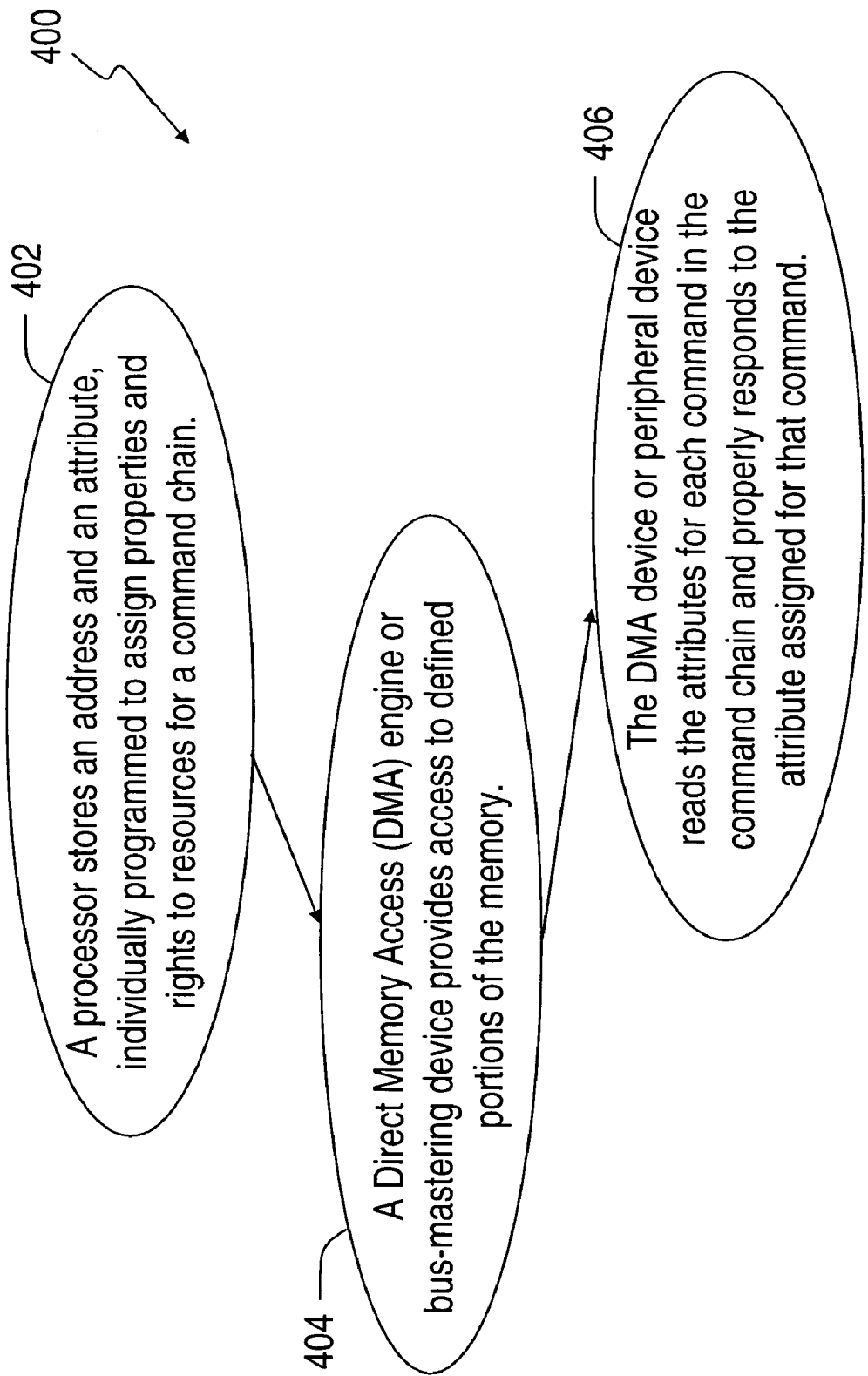
FIG. 4 shows examples of a DMA engine and peripheral devices operating with the processor in accordance with programmed attributes.

FIG. 4 describes DMA engine 22 and/or peripheral devices operating with processor 12 in accordance with programmable, assigned attributes. Processor 12 may store an address and an attribute that is individually programmed, where the attribute may have assigned properties and rights to resources (process 402). In process 404, a transaction initiator provides access to defined portions of the memory in accordance with a value of the attribute. In a process 406, the transaction initiator reads the attributes for each command in the command chain and properly responds to the attribute assigned with that command.

Method 400 is performed to ensure proper operations by the processor, as well as the other devices, in accordance with the attribute. The attribute may be a security attribute, for example, to prevent un-trusted code from accessing secure resources. Method 400 is not limited by the particular type of apparatus of software element performing the method. The various actions in method 400 may be performed in the order presented, or may be performed in a different order. Further, in some embodiments, some actions shown in FIGS. 3 and 4 may be omitted from method 400.

By now it should be apparent that the present invention provides security while enhancing processor execution and efficiency. This programmable transaction initiator architecture for systems having secure and non-secure modes provides the DMA device and bus-mastering peripherals a dynamic grant to access secure resources. This architecture may be incorporated in trusted computing platforms, or alternatively, provide devices that are not security-aware with a flexible, backward-compatible method of accessing secure resources. Command chains may be individually programmable and rights granted to launching secure command chains based on an attached secure/non-secure status. The secure bit ensures that DMA devices have access to secure resources on a command-chain by command-chain basis. This architecture further ensures that only a processor in secure mode may give a command chain, or a part of a command chain, a secure status.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A device comprising:
   a bus;
   a transaction initiator coupled to the bus to perform tasks according to a command chain, the command chain including a plurality of stored commands;
   a storage area programmable to provide a security status for the command chain; and
   a memory to store the plurality of commands as a linked list, each command to be stored as either a secure command or a non-secure command;
   wherein if the security status is set to a secure level for the command chain, the transaction initiator has the authority to access an initial one or more commands of the command chain at a secure level and any succeeding commands after the initial one or more commands at a non-secure level; and
   wherein each command in the linked list includes an address of a next command in the linked list and a storage area to indicate a security status of the next command.

2. The device of claim 1, wherein a first command is stored as a secure command in the initial one or more commands of the command chain, and
   wherein if the storage area of the first command indicates that a security status of a next following second command in the linked list is secure, then the second command is stored as a secure command.

3. The device of claim 2, wherein if the storage area of the first command indicates that the security status for the second command is non-secure, then the second command and all following commands after the second command in the linked list are stored as non-secure commands.

4. The device of claim 1, wherein the transaction initiator is a programmable DMA (Direct Memory Access) device.

5. The device of claim 1, wherein the transaction initiator is a bus-mastering peripheral.

6. A method comprising:
   storing a command chain as a linked list of commands in a memory, wherein an initial one or more of the commands in the command chain are stored in a secure memory space, the initial one or more commands including a first command of the command chain, and wherein any subsequent commands in the command chain following the initial one or more commands are stored in a non-secure memory space;
   programming a device to access the first command of the command chain at a secure level;
   reading the first command from the secure memory space, the first command including an address of a second command of the command chain and a storage area for a security attribute for the second command of the command chain, the second command following the first command in the linked list; and
   reading the second command, wherein:
      if the storage area of the first command contains a secure security attribute for the second command, the second command is read from the secure memory space at the secure level; and
      if the storage area of the first command contains a non-secure security attribute for the second command is non-secure, the second command and any commands following the second command are read from the non-secure memory space at a non-secure level.

7. The method of claim 6, wherein the secure memory space is reserved for secure memory commands.

8. The method of claim 6, wherein if the security attribute for the second command is non-secure, then the second command and all following commands after the second command in the linked list are contained in the non-secure memory space.

9. The method of claim 6, wherein the device is a DMA (Direct Memory Access) device.

10. The method of claim 6, wherein the device is a bus-mastering peripheral device.

11. The method of claim 10, further comprising dynamically granting the bus-mastering peripheral device access to secure resources.

12. A system comprising:
    an antenna to receive a signal;
    a processor coupled with the antenna, the processor including a DMA (direct memory access) device;

a control register to store a secure or non-secure value for a command chain stored as a linked list of commands for the DMA; and a memory, the memory being accessible to the DMA device, the memory to store the linked list of commands for the DMA device, wherein each command in the linked list includes an address and a security attribute for a next following command in the linked list, the memory including a secure memory for the storage of secure commands and a non-secure memory for the storage of non-secure commands;

wherein if the control register indicates a secure value, then the DMA device is authorized to access a first secure command in the linked list in the secure memory; and wherein if the security attribute of the first secure command indicates a secure value for a next following second command, the DMA device is authorized to access the second command as a second secure command in the secure memory, and if the security attribute of the first secure command indicates a non-secure value for the next following second command, the DMA device is to access the second command and any commands following the second command as non-secure commands in the non-secure memory.

13. The system of claim 12, wherein the security attributes for the commands are utilized by the processor to program a secure or non-secure status for each command in the linked list of commands.

* * * * *